United States Patent [19]

Koch

[11] Patent Number: 5,007,672
[45] Date of Patent: Apr. 16, 1991

[54] COVER SYSTEM FOR FLAT BED VEHICLES

[75] Inventor: Ralph E. Koch, Poseyville, Ind.

[73] Assignee: Ralph E. Koch Trucking, Inc., Poseyville, Ind.

[21] Appl. No.: 568,413

[22] Filed: Aug. 16, 1990

[51] Int. Cl.⁵ .............................................. B60P 7/04
[52] U.S. Cl. .................................... 296/100; 296/181; 296/191; 296/43; 296/138
[58] Field of Search ............... 296/100, 181, 183, 138, 296/36, 43, 191

[56] References Cited

U.S. PATENT DOCUMENTS

| | | | |
|---|---|---|---|
| 2,239,888 | 4/1941 | Forrester | 296/105 |
| 3,453,020 | 7/1969 | Santillo, Jr. | 296/138 X |
| 4,583,777 | 4/1986 | Myburgh | 296/100 |

Primary Examiner—Dennis H. Pedder
Attorney, Agent, or Firm—Woodard, Emhardt, Naughton, Moriarty & McNett

[57] ABSTRACT

A tarpaulin side kit for use with a separate top cover in covering a load on a vehicle having a flat bed and a plurality of post brackets mounted at spaced apart locations along the periphery of the flat bed. The side kit includes a plurality of longitudinally arranged inverted U-shaped bows, a plurality of side posts, and a plurality of side cover sections formed of a flexible, sheet-like tarp material. The side cover sections each have a plurality of pocket sized to receive the posts and support the side cover sections from slipping down on the posts. A weather flap extends along the length of each of the side cover sections and overlies the flat bed to protect the load from weather. A plurality of stake extensions are also provided to permit use of the side kit with higher standing loads. The bows, side posts and stake extension are conveniently stored in carries mounted to the underside of the bed of the vehicle.

11 Claims, 6 Drawing Sheets

COVER SYSTEM FOR FLAT BED VEHICLES

BACKGROUND OF THE INVENTION

Field of the Invention

The present invention relates to an improved cover system for flat bed vehicles and, more particularly, to a tarpaulin type cover system which may be erected and removed as desired to cover or uncover the space above the flat bed.

Flat beds trailers have been used for many years to haul a wide variety of loads. The flat bed facilitates loading onto the trailer as there are no walls to restrict or impede access thereon. However, in order to protect and/or contain the loads, it is often desirable to erect a structure covering the top and sides of the load. For such purposes, many flat bed trailers are provided with stake bodies on which may be erected rigid sidewall assemblies and a fabric tarpaulin type top cover. Usually the sidewall assemblies, which are known as side kits, include a number of wooden posts or stakes, wooden side boards, a wooden headboard panel, and a wooden tailgate panel. The posts are received in rectangular shaped brackets which are mounted at regular intervals along the length of the flat bed and receive the side boards. The posts are provided with a socket at the top end to receive inverted U-shaped bow members of metal construction which extend over the load between the sidewalls formed by the sideboards. The fabric top cover extends over the bows and overlaps the sidewalls, with tie down ropes being used to secure the top cover to the flat bed.

A significant disadvantage of the cover system just described is its weight. It is estimated that the weight of a side kit for a 48 foot long flat bed trailer having ½ inch thick panels and sideboards is approximately 640 pounds. This is a significant amount of extra weight, especially given the fact that quite often the side kit is not being used but must nevertheless be stored on the trailer. Excess bulk and weight can also be a significant disadvantage to a truck driver as the driver cannot count on the availability of any assistance in erecting or removing the cover system.

In the past, tarpaulin cover systems have been devised to cover both the top and sides of a flat bed trailer, thereby avoiding certain disadvantages associated with conventional cover systems employing wooden side kits. However, such systems have other disadvantages which have prevented any of these systems from coming into widespread use. For example, many of these types of cover systems employ mechanical retraction and extension systems which are themselves expensive, heavy and/or unreliable.

SUMMARY OF THE INVENTION

A cover system for covering a load on a vehicle having a flat bed and a plurality of post brackets, according to one embodiment of the present invention comprises a plurality of longitudinally arranged inverted U-shaped bows having a bow shaped section extending transversely across the flat bed and a pair of downwardly extending legs. There is further provided a plurality of side posts each having a lower end adapted to be received in a post bracket on the flat bed and an upper end defining a socket adapted to receive therein one of the pair of downwardly extending legs of the U-shaped bows. The cover system additionally includes a top cover formed of a flexible, sheet-like tarpaulin material supported by the plurality of U-shaped bows and sized to extend over the top of a load carried on the flat bed of the vehicle. Yet further, the cover system is characterized by a side cover means including a plurality of side cover sections formed of a flexible, sheet-like tarpaulin material, the side cover sections each having a plurality of pockets sized to receive therein the side posts, each pocket having a portion thereof which is arranged to overlie the upper end of a corresponding one of the posts and defining an opening through which is received a corresponding one of the pair of downwardly extending legs of the U-shaped bows, the side cover sections extending from the top ends of the posts to the flat bed of the vehicle.

Accordingly, it is an object of the present invention to provide an improved cover system for a flat bed vehicle.

Related objects and advantages of the present invention will become more apparent by reference to the following figures and detailed description.

DESCRIPTION OF THE PREFERRED EMBODIMENT

Figure 1:
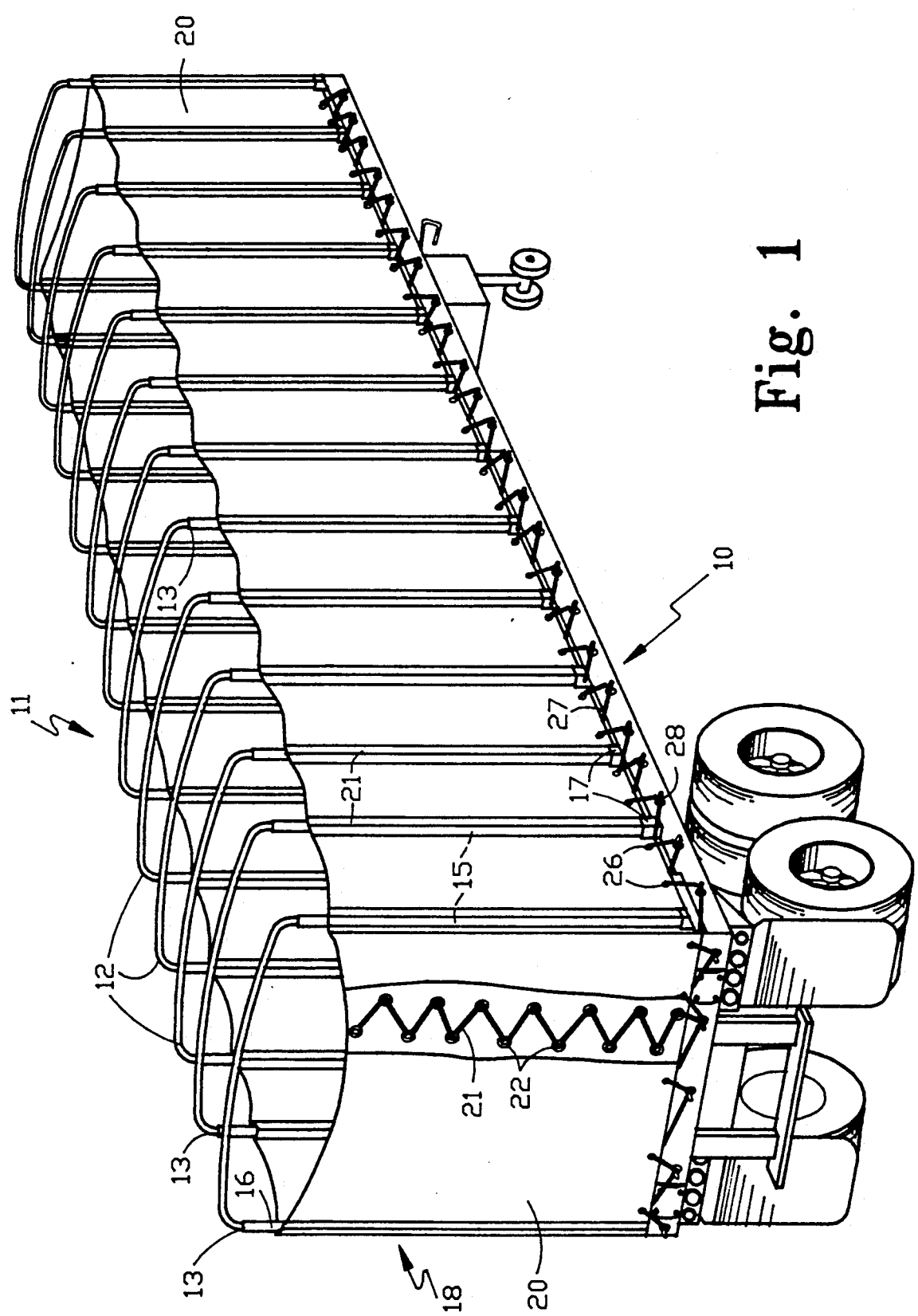
FIG. 1 is a perspective view of a flat bed trailer with the cover system of the present invention installed thereon, but without the top cover.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
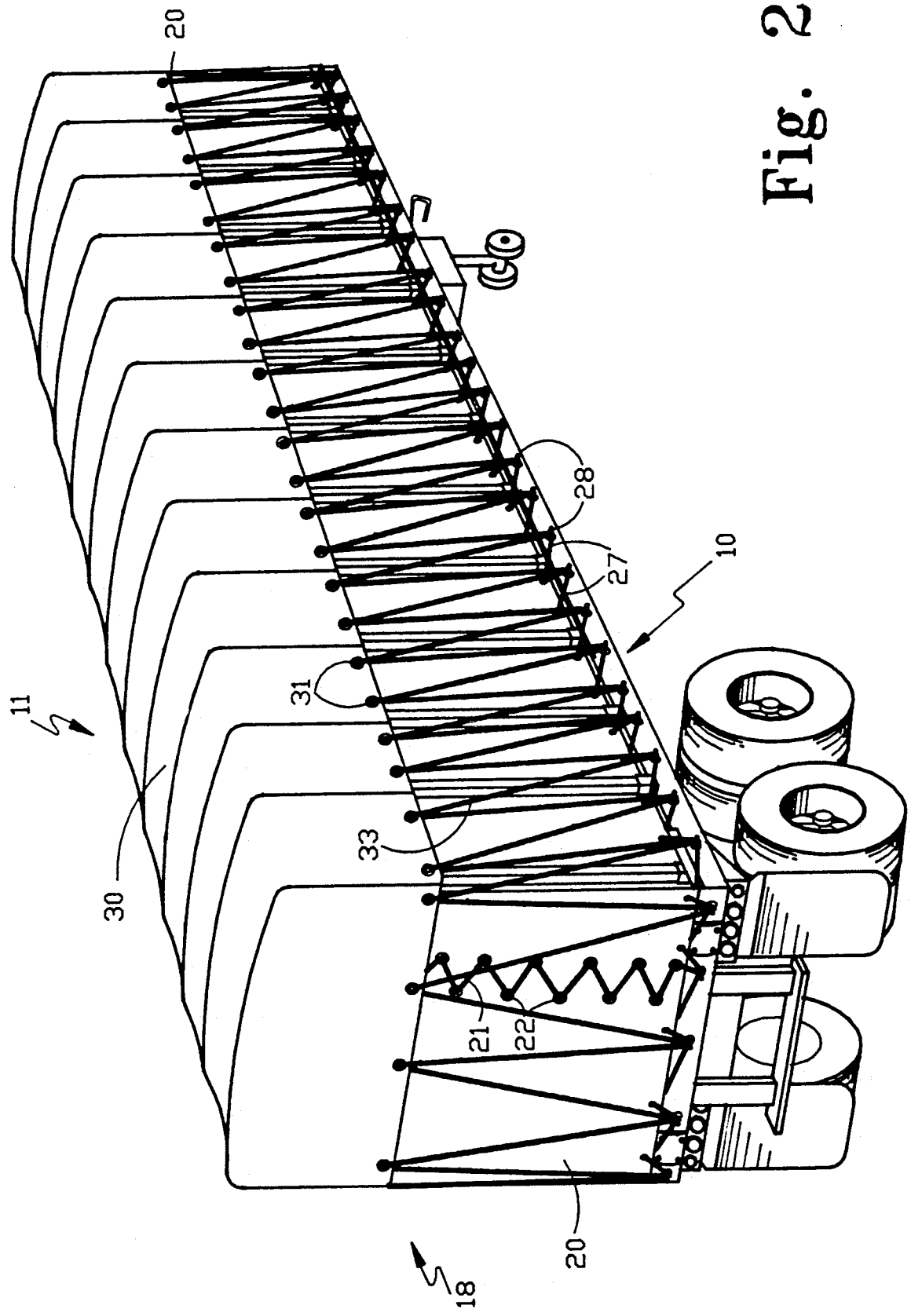
FIG. 2 is a perspective view of a flat bed trailer of FIG. 1 with the top cover.

Referring now to FIGS. 1 and 2, there is shown a flat bed trailer 10 of conventional design having a tarp cover system of the present invention installed thereon and generally designated at 11. The tarp cover system includes a plurality of longitudinally arranged inverted U-shaped bows 12 having a bow shaped section extending transversely across the flat bed of trailer 10 at spaced locations extending along the full length of the flat bed. Each of the bows 12 has a pair of downwardly extending legs 13 which are received inside stake extensions 16. Each of the stake extensions 16 are in turn received at their lower ends inside sockets provided in the upper portion of side posts 15 which are mounted in rectangular shaped post brackets 17 conventionally found on most flat bed type trailers. The stake extensions 16 are provided so that loads having a vertical height greater than the top of the side posts may be accommodated inside the tarp cover system of the present invention. When the stake extensions 16 are not in use, the legs 13 of bows 12 are mounted directly to the side posts 15 within the sockets provided at their upper ends.

A side cover means is shown generally at 18 in FIG. 1 including a pair of side cover sections 20 formed of a flexible, sheet-like tarpaulin material. Each of the side cover sections has a plurality of pockets 23 sized to received therein the side posts 15. A first of the side cover sections 20 extends from the front end of trailer 10 along the left or driver side thereof and extends partially around the rearward end of trailer 10. The other of the pair of side cover sections 20 extends from the front end of trailer 10 along the right or passenger side thereof and also extends partially around the rearward end of trailer 10. The side cover sections 20 overlap one another at both the front and rearward ends of trailer 10 so as to completely enclose all sides of the flat bed. The side cover sections 20 are secured to one another along their overlapping portions by a rope 21 which is zig-zagged through grommets 22 specifically provided for this purpose. Other fastening means, such as a zipper may alternatively or additionally to provided to secure side cover sections 20 together. The lower portions of the side cover sections 20 are provided with a plurality of grommets 26 which, along with rope 27, provide a means for securing the side cover sections to a plurality of hooks 28 mounted to the sides of the flat bed portion of trailer 10 at spaced apart locations.

Figure 3:
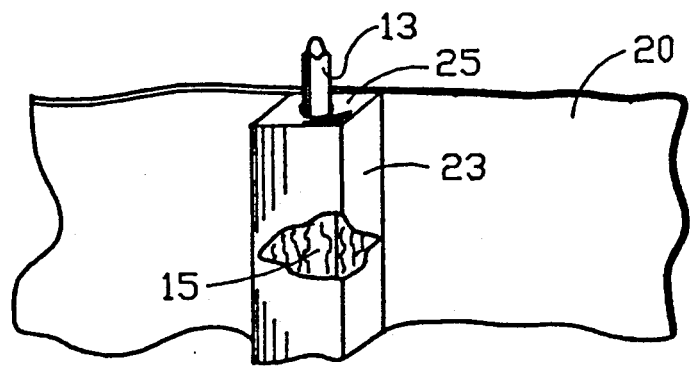
FIG. 3 is a fragmentary perspective view of a representative one of the post pockets of the side tarp with a bow extending therefrom.

Referring additionally to FIG. 3, each of the side cover sections 20 has plurality of side post pockets similar to pocket 23 for receiving therein a corresponding one of the side posts 15 which are typically made of wood. Pockets 23 are sewn onto the outside facing side of side cover sections 20 and are preferably made of the same material. The bottom end of each of the pockets 20 is open so as to receive the side posts 15. The top end of the pockets 20 are each partially covered by a strip 25 sewn thereto and made of nylon or other suitable material. The strips 25 define openings which receive therethrough legs 13 of bows 12 or stake extensions 16 as the case may be. The strips 25 overlie the top ends of side posts 15 and thus serve to support the side cover sections 20 in their installed position on side posts 15 of trailer 10 in the fashion seen in FIG. 1.

Referring now particularly to FIG. 2, a conventional tarpaulin top cover 30 formed of a waterproof canvas or other suitable material is shown supported by U-shaped bows 12 and is sized to extend over the top of a load carried on the flat bed of the trailer 10. The top cover 30 is provided with a plurality of grommets 31 which provide a means of fastening the top cover to trailer 10. As seen in FIG. 2, this is accomplished by lashing a rope 33 through grommets 31 and around hooks 28.

Figure 4:
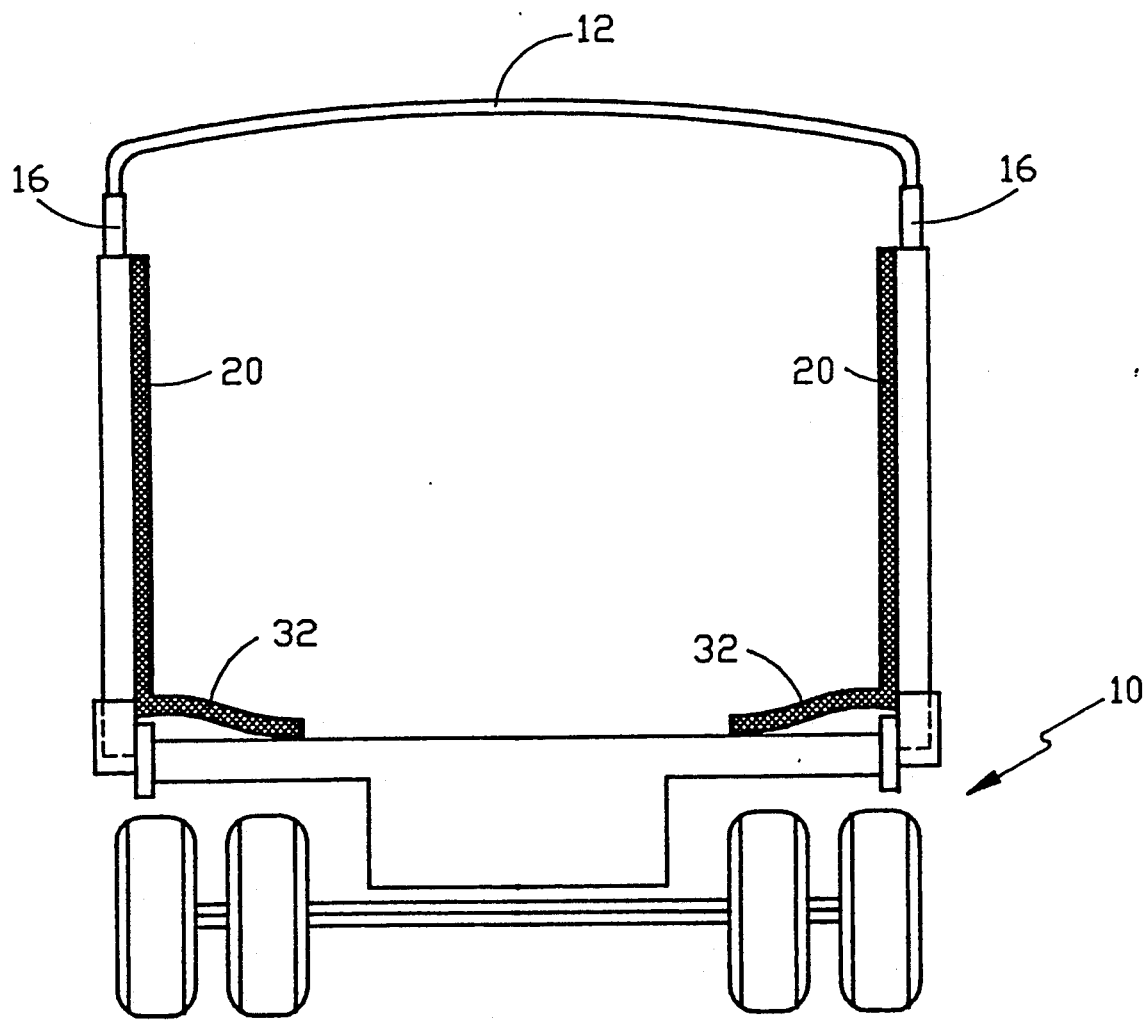
FIG. 4 is a cross section view of the flat bed trailer of FIG. 1.

As can be seen with reference to FIG. 4, each of the side cover sections 20 includes a weather flap 32 preferably formed of the same tarpaulin material as the side cover sections 20. The weather flaps 32 are sewn or otherwise suitably secured to the inward facing side of side cover sections 20 and extend along the full length thereof. The weather flaps 32 are sufficiently sized to overlie the flat bed of the vehicle a distance sufficient to prevent rain from penetrating onto the load from beneath the side cover sections 20.

It may be appreciated that the tarp cover system of the present inventions makes use of many of the same kit components presently used to convert an open flat bed trailer to one which fully covers and protects a load positioned on the flat bed. Thus, the top cover 30, side posts 15 and bows 12 may be the same components found on flat bed trailers having a conventional side wall construction formed of a number of wooden side panels.

In the preferred embodiment, the side cover sections 20 are adapted for a flat bed trailer having a 48 foot length and side posts sized to extend 4 feet above the flat bed. In this embodiment, the side cover sections 20 are 49 and ½ inches in height, the weather flaps 32 have a width of approximately 4 and ½ inches, and the preferred construction of the tarpaulin is a vinyl material having a 22 oz. weight per square yard. For weight comparison purposes, side cover sections formed to these specifications weigh approximately 50 lbs. each whereas the weight of a standard ½ inch thick wood side panel kit is approximately 640 lbs.

A significant feature of the present invention is the provision of side cover sections 20 in two separate sections. This permits the side cover sections 20 to be installed by one person without assistance owing to the decreased weight and bulk. Further, the use of side tarps separate from the top cover 30 permits the ability to unload some loads with a forklift with the side cover sections 20 in place and only the top cover 30 needing to be removed.

Figure 5:
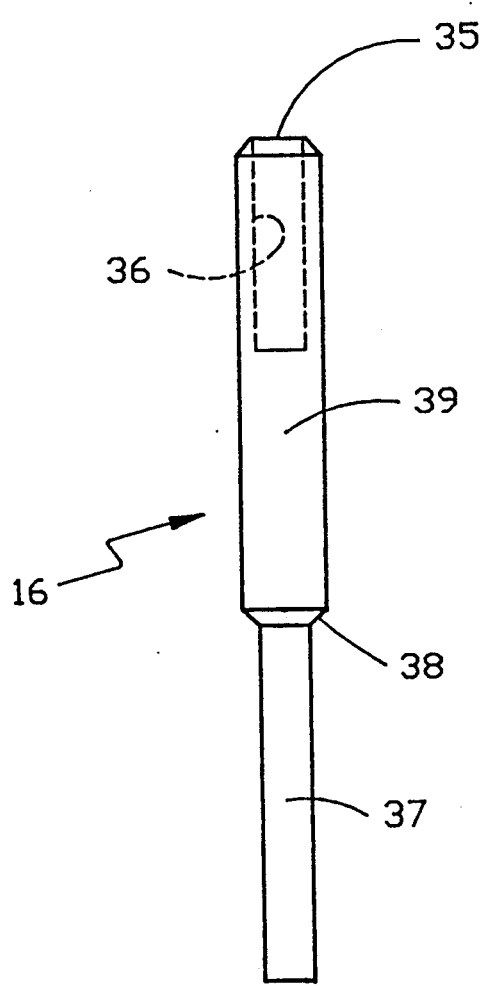
FIG. 5 is an elevation view of a stake extension.

The construction of the stake extensions 16 may be seen with reference to FIG. 5. Stake extensions 16 have a generally circular cross sectional shape. The top end 35 is provided with a socket 36 which is sized to slidably receive therein one of the legs 13 of a bow 12. The lower portion 37 of extension 16 is sized to be slidably received within a corresponding socket in the top end of one of the side posts 15 and supported thereon along a chamfered annular surface 38 extending around stake extension 16. An upper portion 39 extends above surface 38 and defines the height which the sides posts 15 are effectively extended. In the preferred embodiment, the length of upper portion 39 is approximately 10 and ½ inches.

Figure 6:
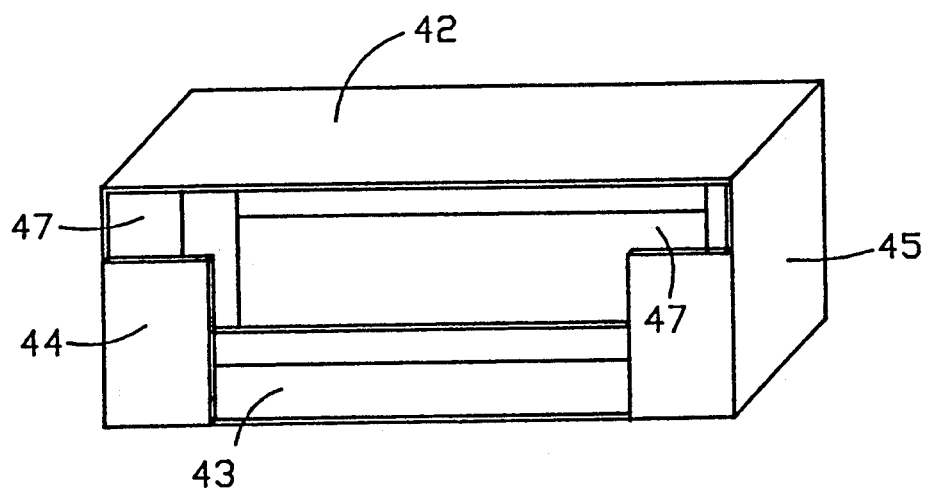
FIG. 6 is a perspective view of a stake extension carrier.

Provision is also made for storing the bows 12, side posts 15 and stake extensions 16 conveniently under the flat bed of trailer 10. As can be seen with reference to FIG. 6, stake extension carrier is formed of horizontal members 42 and 43 connected by vertical members 44 and 45. The length of horizontal members 42 and 43 is sized slightly larger than the length of stake extensions 16 to permit stacking them inside the carrier in a horizontal orientation. The stake extensions 16 are received inside the carrier through a slots 47 located at the upper end thereof. In the preferred embodiment, there are three carriers mounted in an upright position on the left side of trailer 10 under the trailer bed.

Figure 7:
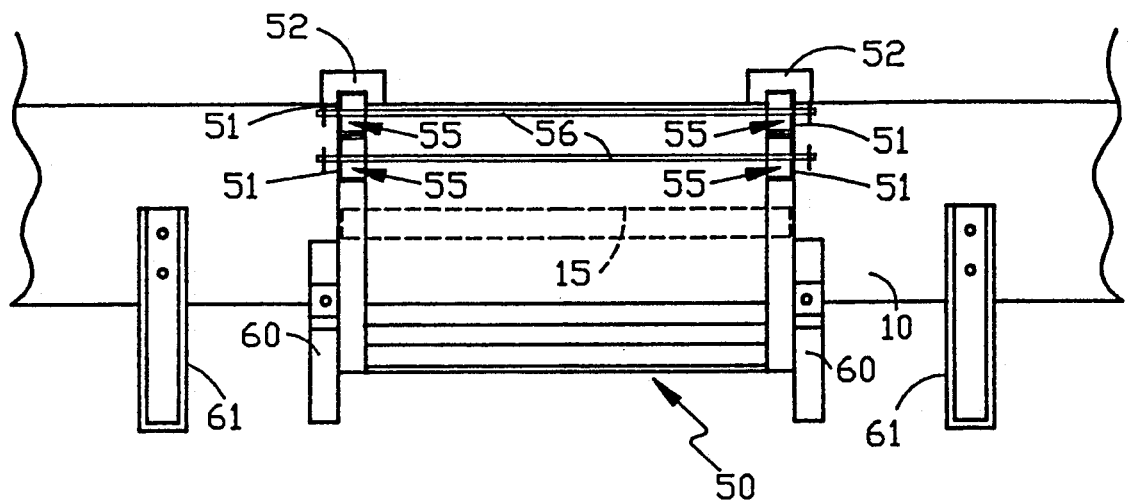
FIG. 7 is an elevation view of a post and bow carrier.
Figure 8:
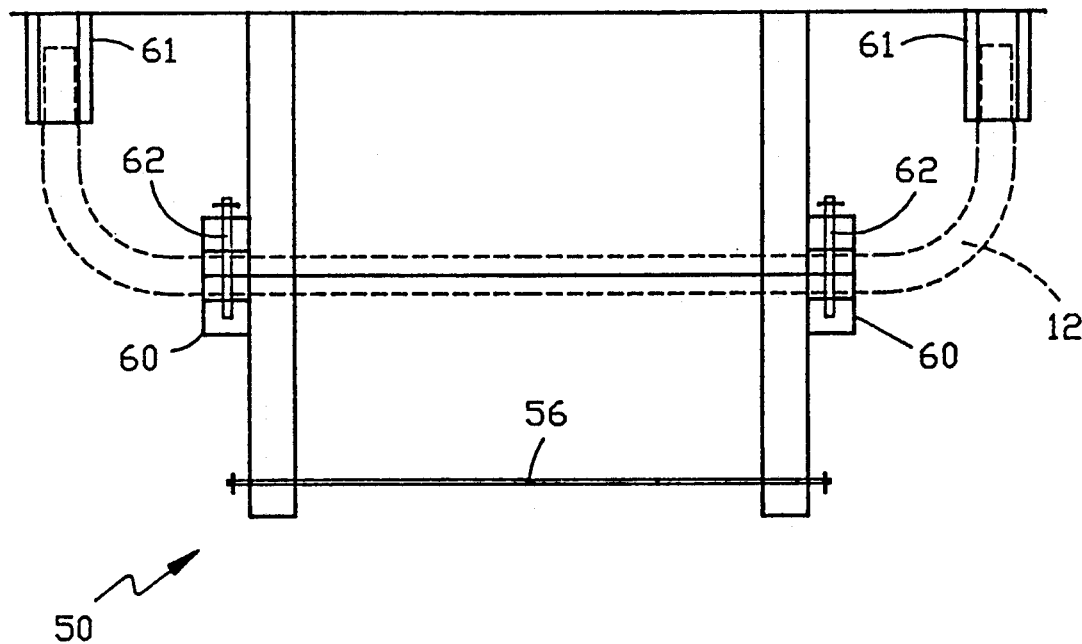
FIG. 8 is a top view of the post and bow carrier of FIG. 7.
Figure 9:
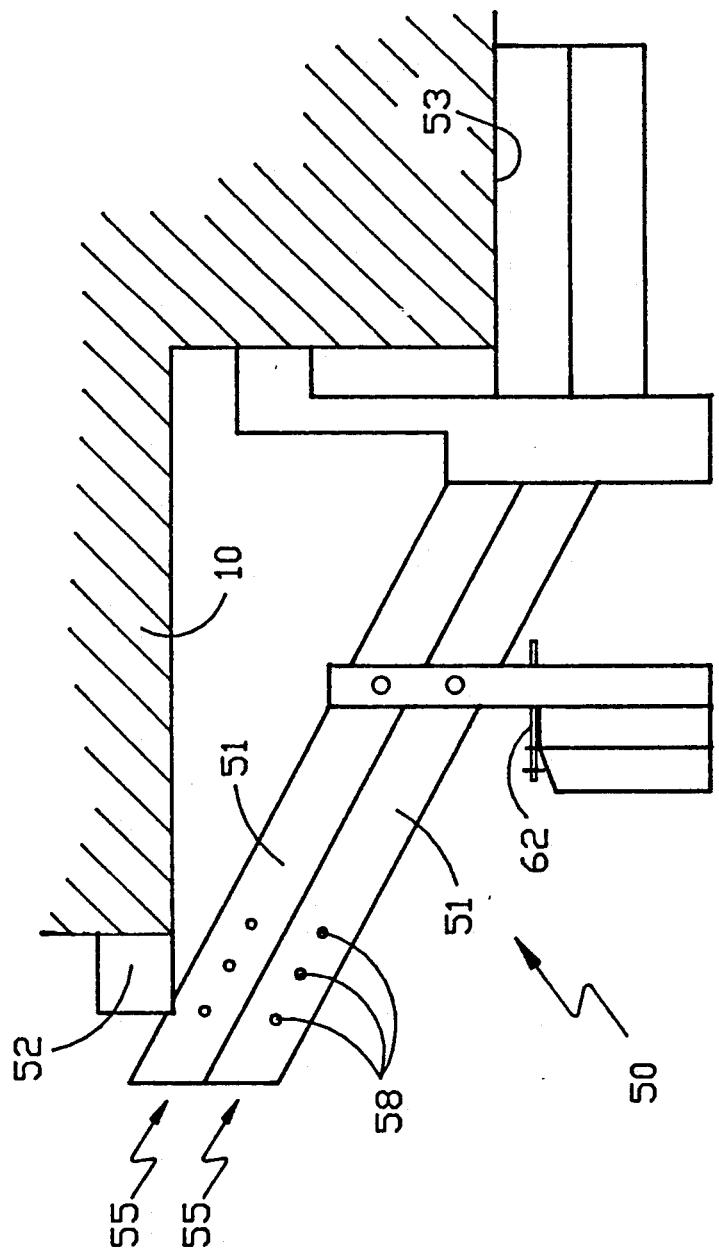
FIG. 9 is a right side view of the post and bow carrier of FIG. 7.

FIGS. 7-9 illustrate the construction of a carrier 50 for storing the sides posts 15 and bows 12. Channels 51 are mounted to the right underside of the bed of trailer 10 at the top via a mounting member 52 and bolted or otherwise fixedly fastened thereto at the bottom along surface 53. Side posts 15 are placed inside the carrier 50 in a horizontal orientation through access openings indicated by arrows 55. Anti-theft rods 56 limit access through the access openings. A series of aligned holes 58 permit the position of the rods 56 to be varied. Although not shown, various conventional locking means may be used to prevent unauthorized removal of rods 56 to access side posts 15. Bows 12 are stored in a horizontal orientation stacked within vertical slots defined by members 60 and 61. Rods 62 limit access to the bows 12 stored within carrier 50 and may also be provided with locking means to prevent unauthorized removal of the bows 12.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cover system for covering a load on a vehicle having a flat bed and a plurality of side post brackets, comprising:
   a plurality of longitudinally arranged inverted U-shaped bows having a bow shaped section extending transversely across the flat bed and a pair of downwardly extending legs;
   a plurality of side posts each having a lower end adapted to be received in one of the side post brackets and an upper end defining a socket adapted to receive therein one of said pair of downwardly extending legs of said U-shaped bows;
   a top cover formed of a flexible, sheet-like tarpaulin material supported by said plurality of U-shaped bows and sized to extend over the top of a load carried on the flat bed of the vehicle; and
   a side cover means including a plurality of side cover sections formed of a flexible, sheet-like tarpaulin material, said side cover sections formed separate from each other and from said top cover and each having a plurality of pockets sized to receive therein said side posts, each pocket having a portion thereof which is arranged to overlie said upper end of a corresponding one of said side posts and defining an opening through which is adapted to be received a corresponding one of said pair of downwardly extending legs of said U-shaped bows, said side cover sections extending from the top ends of said posts to the flat bed of the vehicle.

2. The cover system of claim 1 wherein each of said side cover sections includes a weather flap formed of a flexible, sheet-like tarp material and extending along the length thereof, said weather flaps adapted to overlie a portion of the flat bed of the vehicle.

3. The cover system of claim 1 and further comprising:
   a fastening means for fastening said side cover sections to one another.

4. The cover system of claim 1 and further comprising:
   a plurality of stake extensions each having one end adapted to be received in said socket of a corresponding one of said sides posts and another end having a socket for receiving a corresponding one of said pair of downwardly extending legs of said U-shaped bows, said pocket openings sized to receive said stake extensions therethrough.

5. The cover system of claim 3 wherein said fastening means includes a plurality of grommets located on overlapping portions of said cover sections and a rope lashing said side cover sections together through said grommets.

6. The cover system of claim 4 and further comprising:
   a first carrier means mounted to the underside of the bed of the trailer, said first carrier means for storing said stake extensions; and
   a second carrier means mounted to the underside of the bed of the trailer, said second carrier means for storing said side posts and said U-shaped bows.

7. A tarpaulin side kit for use with a separate tarpaulin top cover in covering a load on a vehicle having flat bed and a plurality of post brackets mounted at spaced apart locations along the periphery of the flat bed, comprising:
   a plurality of longitudinally arranged inverted U-shaped bows having a bow shaped section extending transversely across the flat bed and a pair of downwardly extending legs;
   A plurality of side posts each having a lower end adapted to be received in a post bracket on the flat bed and an upper end defining a socket adapted to receive therein one of said pair of downwardly extending legs of said U-shaped bows; and
   a tarpaulin side cover means including a plurality of side cover sections formed of a flexible, sheet-like tarpaulin material, said side cover sections each having a plurality of pockets sized to receive therein said side posts, each pocket having a portion thereof which is arranged to overlie said upper end of a corresponding one of said side posts and defining an opening through which is received a corresponding one of said pair of downwardly extending legs of said U-shaped bows, said side cover sections extending from the top ends of said side posts to the flat bed of the vehicle.

8. The tarpaulin side kit of claim 7 wherein each of said side cover sections includes a weather flap formed of a flexible, sheet-like tarp material and extending along the length thereof, said weather flaps adapted to overlie a portion of the flat bed of the vehicle with said cover sections supported vertically upon the side posts.

9. The tarpaulin side kit of claim 7 and further comprising:
   a fastening means for fastening said side cover sections to one another.

10. The tarpaulin side kit of claim 7 and further comprising:
    a plurality of stake extensions each having one end adapted to be received in said socket of a corresponding one of said side posts and another end having a socket for receiving a corresponding one of said pair of downwardly extending legs of said U-shaped bows, said pocket openings sized to received said stake extensions therethrough.

11. The tarpaulin side kit of claim 9 wherein said fastening means includes a plurality of grommets located on overlapping portions of said cover sections and a rope lashing said side cover sections together through said grommets.

* * * * *

UNITED STATES PATENT AND TRADEMARK OFFICE
CERTIFICATE OF CORRECTION

PATENT NO. : 5,007,672

DATED : April 16, 1991

INVENTOR(S) : Ralph E. Koch

It is certified that error appears in the above-identified patent and that said Letters Patent is hereby corrected as shown below:

On the title page:
In the Abstract, at line 9, the word "pocket" should read --pockets--.
On the title page:
In the Abstract, at line 16, the word "carries" should read --carriers--.

At column 3, line 14, the word "received" should read --receive--.

At column 3, line 28, the word "to" should read --be--.

At column 4, line 43, the word "sides" should read --side--.

At column 4, line 54, following the word "carrier", please insert --40--.

At column 4, line 56, following the word "carrier", please insert --40--.

At column 4, line 58, following the word "carriers", please insert --40--.

At column 4, line 61, the word "sides" should read --side--.

At column 6, line 17, following the word "having", please insert --a--.

At column 6, line 25, the phrase "A plurality" should read --a plurality--.

At column 6, line 46, following the word "said", please insert --side--.

At column 6, line 60, "ceived" should read --ceive--.

UNITED STATES PATENT AND TRADEMARK OFFICE
CERTIFICATE OF CORRECTION

PATENT NO. : 5,007,672

DATED : April 16, 1991

INVENTOR(S) : Ralph E. Koch

It is certified that error appears in the above-identified patent and that said Letters Patent is hereby corrected as shown below:

At column 6, line 63, following the word "said", please insert --side--.

Signed and Sealed this

Eleventh Day of August, 1992

Attest:

DOUGLAS B. COMER

*Attesting Officer*    *Acting Commissioner of Patents and Trademarks*